United States Patent
Carter et al.

(10) Patent No.: US 7,072,055 B1
(45) Date of Patent: Jul. 4, 2006

(54) ENCAPSULATED PDF DIRECT PRINTING

(75) Inventors: Bryan K. Carter, Meridian, ID (US); Brian C. Hiatt, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/541,107

(22) Filed: Mar. 31, 2000

(51) Int. Cl.
  *G06F 13/00* (2006.01)
  *G06F 3/12* (2006.01)
(52) U.S. Cl. .................. 358/1.15; 358/1.9; 358/1.18
(58) Field of Classification Search ............. 358/1.15, 358/1.9, 1.4, 1.6, 1.11, 1.13, 1.18, 524, 488, 358/526, 530; 382/112, 302, 305
See application file for complete search history.

(56) References Cited

U.S. PATENT DOCUMENTS

| 6,189,020 | B1 * | 2/2001 | Shimizu ............... 715/526 |
| 6,336,124 | B1 * | 1/2002 | Alam et al. ............ 715/523 |
| 6,433,882 | B1 * | 8/2002 | Mori et al. ............ 358/1.13 |

* cited by examiner

*Primary Examiner*—Douglas Q. Tran

(57) ABSTRACT

A portable document format (pdf) file is printed by creating an intermediate file including the contents of the pdf file, adding at least one formatting command to the intermediate file, and sending the intermediate file to a printer for printing. The intermediate file is either created by creating a copy of the pdf file and designating the copy of the pdf file as the intermediate file or by creating the intermediate file, reading the contents of the pdf file, and inserting the contents of the pdf file into the intermediate file. The intermediate file is sent to the printer either by writing the intermediate file to a printer port or by writing the intermediate file to a printer spool file.

15 Claims, 1 Drawing Sheet

ENCAPSULATED PDF DIRECT PRINTING

FIELD OF THE INVENTION

This invention relates in general to printing technology and, more particularly, to printing PDF formatted files without a printer driver.

BACKGROUND OF THE INVENTION

Portable document format (pdf) has become an industry-wide standard for electronic distribution of platform-independent files. The pdf format is defined by Adobe, such that pdf files may be viewed, navigated, and printed while retaining the content and format integrity of the original document.

Traditionally, pdf files were printed by opening the file using appropriate software, then printing the pdf file from within the software. The printing process involved a driver for a printer converting the pdf file to PostScript, PCL, or another page description language. The PostScript, PCL, or other page description language was then sent to the printer.

Some modern printers are able to interpret pdf files. For such printers, the printer driver may be bypassed when printing pdf files. The pdf files may be sent directly to a printer for printing. Sending the pdf file directly to the printer results in a more efficient method for printing the pdf file. However, this method does not allow the output of the printer to be formatted in any way aside from the formatting included in the pdf file.

SUMMARY OF THE INVENTION

According to principles of the present invention, a portable document format (pdf) file is printed by creating an intermediate file including the contents of the pdf file, adding at least one formatting command to the intermediate file, and sending the intermediate file to a printer for printing.

According to further principles of the present invention, the intermediate file is either created by creating a copy of the pdf file and designating the copy of the pdf file as the intermediate file or by creating the intermediate file, reading the contents of the pdf file, and inserting the contents of the pdf file into the intermediate file.

According to further principles of the present invention, the intermediate file is sent to the printer either by writing the intermediate file to a printer port or by writing the intermediate file to a printer spool file.

Other objects, advantages, and capabilities of the present invention will become more apparent as the description proceeds.

DETAILED DESCRIPTION OF THE INVENTION

Figure 1:
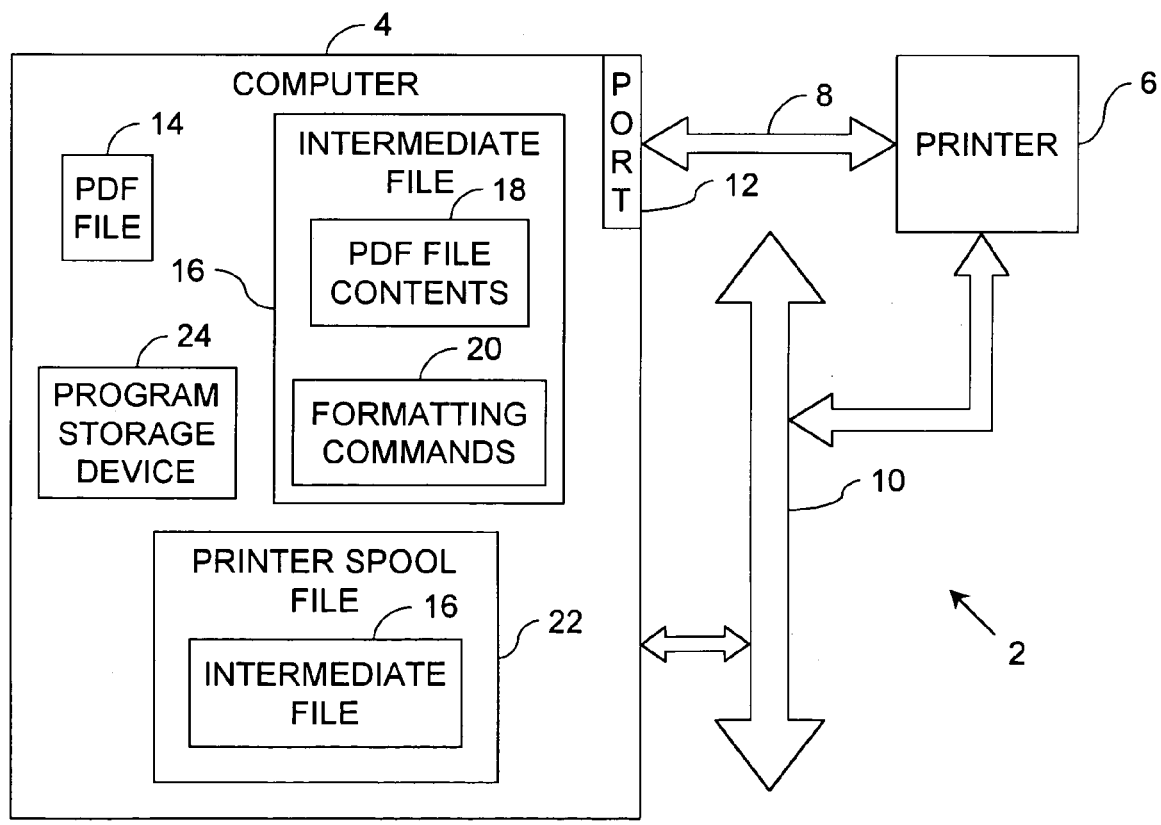
FIG. 1 is a block diagram illustrating various embodiments of the present invention system for printing a pdf file.

Illustrated in FIG. 1 are various embodiments of a system 2 for printing a pdf file. A computer 4 communicates with a printer 6 either through a local connection 8 or a network 10. Printer 6 is any output device capable of printing onto print media.

Computer 4 is any specific or general-purpose computer running any operating system. Where computer 4 communicates with printer 6 through local connection 8, computer 4 includes a printer port 12, which acts as an interface between computer 4 and local connection 8.

Stored on computer 4 or accessible by computer 4 is a pdf file 14. Intermediate file 16 is created from the contents 18 of pdf file 14 and at least one formatting command 20. In one embodiment, intermediate file 16 is written to printer spool file 22 for spooling intermediate file 16 for printing.

Examples of formatting commands 20 are commands to designate the number of copies of to be printed, whether two-sided printing should be used, the output destination of the printed document, and the finishing options of the printed file. Finishing options include whether the printed document should be stapled and whether multiple copies of the printed document should be collated.

Computer 4 may additionally include a program storage device 24 readable by a computer, tangibly embodying a program, applet, or instructions executable by the computer to carry out instructions or commands necessary for performing the method of the present invention as illustrated below.

Figure 2:
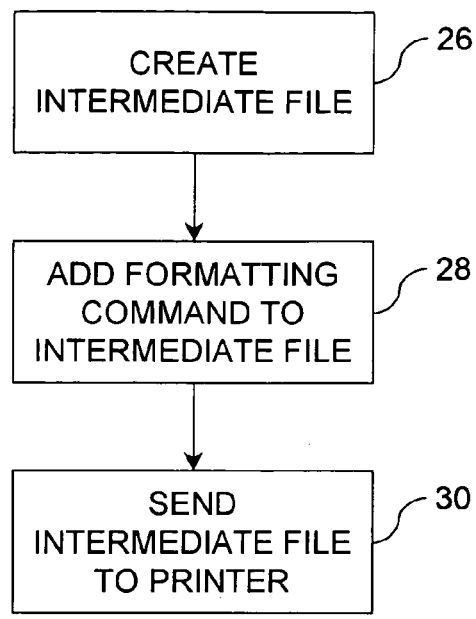
FIG. 2 is a flow chart illustrating the present invention method for printing a pdf file.

Illustrated in FIG. 2 is one embodiment of the method of the present invention for printing a pdf file. Although FIG. 2 depicts steps of the method in a specific order, the present invention encompasses variations in the timing of the illustrated steps as well as additional steps performed between those steps illustrated.

Intermediate file 16 is created 26 to include contents 18 of pdf file 14. Intermediate file 16 is either created 26 by creating a copy of pdf file 14 and designating the copy of pdf file 14 as intermediate file 18 or by creating intermediate file 16, reading contents 18 of pdf file 14, and inserting contents 18 of pdf file 14 into intermediate file 16.

At least one formatting command 20 is added 28 to intermediate file 16. Formatting commands 20 may be added 28 to intermediate file 16 by any method. One method for adding 28 formatting commands 20 to intermediate file 16 includes writing printer control language commands to intermediate file 16. The following table illustrates one embodiment of a set of printer control language commands for selected formatting options.

| option | pjl commands |
|---|---|
| Two-sided printing | <ESC>%-12345X@PJL <CR> <LF><br>@PJL COMMENT Set PS for PDF printing <CR> <LF><br>@PJL SET PERSONALITY = POSTSCRIPT <CR> <LF><br>@PJL COMMENT Set Duplex for PDF job. <CR> <LF><br>@PJL SET DUPLEX = ON <CR> <LF><br>%PDF-1.x<br>PDF data<br><ESC> %-12345@PJL <CR> <LF><br>@PJL COMMENT reset to control panel settings <CR> <LF><br>@PJL RESET <CR> <LF><br><ESC> %-12345X |
| Number of copies | <ESC> %-12345X@PJL <CR> <LF><br>@PJL COMMENT Set PS for PDF printing <CR> <LF><br>@PJL SET PERSONALITY = POSTSCRIPT <CR> <LF><br>@PJL COMMENT Set Number of uncollected copies for PDF job. <CR> <LF><br>@PJL SET COPIES = 1–999 <CR> <LF><br>%PDF-1.x<br>PDF data |

-continued

| option | pjl commands |
|---|---|
| | \<ESC\> %-12345@PJL \<CR\> \<LF\><br>@PJL COMMENT reset to control panel settings \<CR\> \<LF\><br>@PJL RESET \<CR\> \<LF\><br>\<ESC\> %-12345X |
| Output<br>destination | \<ESC\> %-12345X@PJL \<CR\> \<LF\><br>@PJL COMMENT Set PS for PDF printing \<CR\> \<LF\><br>@PJL SET PERSONALITY = POSTSCRIPT \<CR\> \<LF\><br>@PJL COMMENT Set Destination for PDF job. \<CR\> \<LF\><br>@PJL SET OUTBIN = \<CR\> \<LF\><br>%PDF-1.x<br>PDF data<br>\<ESC\> %-12345@PJL \<CR\> \<LF\><br>@PJL COMMENT reset to control panel settings \<CR\> \<LF\><br>@PJL RESET \<CR\> \<LF\><br>\<ESC\> %-12345X |
| Finish<br>staple | \<ESC\> %-12345X@PJL \<CR\> \<LF\><br>@PJL COMMENT Set PS for PDF printing \<CR\> \<LF\><br>@PJL SET PERSONALITY = POSTSCRIPT \<CR\> \<LF\><br>@PJL COMMENT Set send to staple bin for PDF job \<CR\> \<LF\><br>@PJL SET FINISH = STAPLE \<CR\> \<LF\><br>%PDF-1.x<br>PDF data<br>\<ESC\> %-12345@PJL \<CR\> \<LF\><br>@PJL COMMENT reset to control panel settings \<CR\> \<LF\><br>@PJL RESET \<CR\> \<LF\><br>\<ESC\> %-12345X |
| Finish<br>collate | \<ESC\> %-12345X@PJL \<CR\> \<LF\><br>@PJL COMMENT Set PS for PDF printing \<CR\> \<LF\><br>@PJL SET PERSONALITY = POSTSCRIPT \<CR\> \<LF\><br>@PJL COMMENT Set mopy count for PDF job \<CR\> \<LF\><br>@PJL SET QTY = x \<CR\> \<LF\><br>%PDF-1.x<br>PDF data<br>\<ESC\> %-12345@PJL \<CR\> \<LF\><br>@PJL COMMENT reset to control panel settings \<CR\> \<LF\><br>@PJL RESET \<CR\> \<LF\><br>\<ESC\> %-12345X |

Intermediate file 16 is then sent 30 to printer 6. Intermediate file 16 is sent 30 to printer 6 either by writing intermediate file 16 to printer port 12 or by writing intermediate file 16 to printer spool file 22.

Means for carrying out the method steps of the present invention may be located within any of the previously described devices or in a separate device.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

What is claimed is:

1. A method for printing a portable document format (pdf) file, the method comprising:
    (a) creating an intermediate file including the contents of the pdf file;
    (b) inserting at least one formatting command, into the intermediate file, separate from the contents of the pdf file; and,
    (c) sending the intermediate file to a printer for printing.

2. The method of claim 1 wherein creating the intermediate file includes:
    (a) creating a copy of the pdf file; and,
    (b) designating the copy of the pdf file as the intermediate file.

3. The method of claim 1 wherein creating the intermediate file includes:
    (a) creating the intermediate file;
    (b) reading the contents of the pdf file; and,
    (c) inserting the contents of the pdf file into the intermediate file.

4. The method of claim 1 wherein sending the intermediate file to the printer includes writing the intermediate file to a printer port.

5. The method of claim 1 wherein sending the intermediate file to the printer includes writing the intermediate file to a printer spool file.

6. A system for printing a portable document format (pdf) file, the system comprising:
    (a) means for creating an intermediate file including the contents of the pdf file;
    (b) means for inserting at least one formatting command, into the intermediate file, separate from the contents of the pdf file; and,
    (c) means for sending the intermediate file to a printer for printing.

7. The system of claim 6 wherein the means for creating the intermediate file includes:
    (a) means for creating a copy of the pdf file; and,
    (b) means for designating the copy of the pdf file as the intermediate file.

8. The system of claim 6 wherein the means for creating the intermediate file includes:
    (a) means for creating the intermediate file;
    (b) means for reading the contents of the pdf file; and,
    (c) means for inserting the contents of the pdf file into the intermediate file.

9. The system of claim 6 wherein the means for sending the intermediate file to the printer includes means for writing the intermediate file to a printer port.

10. The system of claim 6 wherein the means for sending the intermediate file to the printer includes means for writing the intermediate file to a printer spool file.

11. A computer readable medium readable by a computer, tangibly embodying a program, applet, or instructions executable by the computer to print a portable document format (pdf) file, the method steps comprising:
    (a) creating an intermediate file including the contents of the pdf file;
    (b) inserting at least one formatting command, into the intermediate file, separate from the contents of the pdf file; and,
    (c) sending the intermediate file to a printer for printing.

12. The computer readable medium of claim 11 wherein the step of creating the intermediate file includes:
    (a) creating a copy of the pdf file; and,
    (b) designating the copy of the pdf file as the intermediate file.

13. The computer readable medium of claim 11 wherein the step of creating the intermediate file includes:
    (a) creating the intermediate file;
    (b) reading the contents of the pdf file; and,
    (c) inserting the contents of the pdf file into the intermediate file.

14. The computer readable medium of claim 11 wherein the step of sending the intermediate file to the printer includes writing the intermediate file to a printer port.

15. The computer readable medium of claim 11 wherein the step of sending the intermediate file to the printer includes writing the intermediate file to a printer spool file.

* * * * *